US008858671B2

(12) United States Patent  (10) Patent No.: US 8,858,671 B2
Mazon  (45) Date of Patent: Oct. 14, 2014

(54) METHOD FOR TREATING DOMESTIC WASTE

(76) Inventor: Michel Mazon, Bazens (FR)

( * ) Notice: Subject to any disclaimer, the term of this patent is extended or adjusted under 35 U.S.C. 154(b) by 1171 days.

(21) Appl. No.: 12/447,407

(22) PCT Filed: Sep. 11, 2007

(86) PCT No.: PCT/FR2007/001463
§ 371 (c)(1),
(2), (4) Date: Jan. 6, 2010

(87) PCT Pub. No.: WO2008/053086
PCT Pub. Date: May 8, 2008

(65) Prior Publication Data
US 2010/0107712 A1  May 6, 2010

(30) Foreign Application Priority Data

Oct. 27, 2006 (FR) .................. 06 09478

(51) Int. Cl.
C05F 3/00 (2006.01)
A62D 3/20 (2007.01)
C05C 9/00 (2006.01)
C02F 11/00 (2006.01)
C02F 11/14 (2006.01)
C02F 11/18 (2006.01)

(52) U.S. Cl.
CPC ............. *C05C 9/00* (2013.01); *C02F 11/004* (2013.01); *C02F 11/14* (2013.01); *C02F 11/185* (2013.01)

USPC .................... 71/12; 588/313; 588/320

(58) Field of Classification Search
None
See application file for complete search history.

(56) References Cited

U.S. PATENT DOCUMENTS

| 3,796,637 | A | | 3/1974 | Fusey | |
| 3,877,920 | A | * | 4/1975 | Carlberg | ............ 71/21 |
| 4,006,006 | A | * | 2/1977 | Penque | ............ 71/14 |
| 5,422,015 | A | | 6/1995 | Angell | |
| 6,458,747 | B1 | * | 10/2002 | Kulik | ............ 504/140 |
| 2007/0281349 | A1 | * | 12/2007 | Jaczynski | ............ 435/286.5 |
| 2010/0107712 | A1 | * | 5/2010 | Mazon | ............ 71/13 |

FOREIGN PATENT DOCUMENTS

| GB | 2356195 | 5/2001 |
| JP | 10291877 | 11/1998 |
| WO | 9325329 | 12/1993 |
| WO | 0185645 | 11/2001 |
| WO | 03047782 | 6/2003 |

OTHER PUBLICATIONS

International Search Report dated May 16, 2008, in PCT application.

* cited by examiner

*Primary Examiner* — Jennifer R Smith
(74) *Attorney, Agent, or Firm* — Young & Thompson

(57) ABSTRACT

The invention relates to a new method for treating domestic waste and the like by the combination of two compositions, one containing lime and the other containing urea, to the combinations, to the products obtained by the method and to uses thereof.

14 Claims, No Drawings

METHOD FOR TREATING DOMESTIC WASTE

FIELD OF THE INVENTION

The present application relates to a method for the chemical treatment of non-toxic organic waste of all types, which may or may not be mixed with non-toxic mineral waste, and more particularly of waste from domestic waste and the like, from the agroalimentary industry, from agriculture as well as sludges.

BACKGROUND OF THE INVENTION

The above-mentioned organic waste essentially contains: water, cellulose materials and derivatives (oses and polyoses), lignin, protidic materials and fats, the whole having a high content of microorganisms.

The action of quick lime on the above-mentioned moist organic substances has been known for a long time. However, when the substances are simply mixed with CaO, the action is limited in the first instance to heating the mixture as the CaO is hydrated, but without the pH being homogeneous, because the hydrated compounds ($Ca(OH)_2$) are very poorly soluble and remain retained at the sites of their formation without diffusing further into the mixture.

Consequently, it is necessary to agitate the mixture with the organic substances for a long time in the hope (without any certainty) that the totality of the substances has been in contact with CaO.

During the treatment of the waste, it is important to create an increase in temperature with a minimum of chemical compounds for economic reasons.

The final products should preferably be recoverable and it is therefore desirable to obtain a range of fertilizing products of varying compositions, which, moreover, correspond to national and international standards.

In order to be usable as an organic soil conditioner with or without fertilizer, as a fertilizer or as an enriched compost, it is desirable to enrich the final product with mineral elements such as potassium, sodium, phosphorus and/or nitrogen in order to make it into a more "complete" fertilizer.

It is therefore desirable to make available an improved waste treatment method which permits good thermal conductivity in the reaction, considerable dehydration, a low content of inert products in the final product, conventional mechanical refining.

SUMMARY OF THE INVENTION

The present invention therefore proposes to provide a waste treatment method which meets those requirements and allows the disadvantages mentioned above to be avoided.

According to the present invention, said method is carried out by means of a combination of two chemical compositions (called composition no. 1 and composition no. 2 hereinbelow) formulated according to the invention. Said combinations are capable of reacting simply by being mixed with the organic substances contained in the waste in order to convert them into a dried, sterilized and odourless substrate suitable for commercial recovery, thus making it possible to avoid sending the waste to landfill.

The combination of the chemical compositions formulated according to the invention reacts chemically with the substances to produce an increase in temperature of the order of about a hundred degrees.

DETAILED DESCRIPTION OF THE INVENTION

According to the present invention, composition no. 1 comprises:
quick lime (CaO) and
one or more oxidizing mineral or organomineral compound(s) which are exothermic in contact with water and preferably non-polluting.

The lime is preferably present in powder form. It generally represents from 70 to 95% by weight of composition no. 1.

Said oxidizing mineral or organomineral compound(s) are selected from sodium and/or potassium oxides and/or peroxides, phosphoric anhydride and mixtures thereof.

Said oxidizing mineral or organomineral compound(s) preferably contain sodium, potassium and/or phosphorus. They are generally present in an amount of from 5 to 50% (by weight) in composition no. 1.

When they are present, the sodium and/or potassium oxides and/or peroxides are generally present in an amount of from 10 to 30% (by weight) of composition no. 1.

The sodium and/or potassium oxides and peroxides are generally present in powder form.

It is generally preferred to work in the presence of phosphoric anhydride, which allows the basicity of the reaction mixture, linked with the use of lime, to be neutralized.

The use of phosphoric anhydride also enables a lesser amount of composition no. 1 to be used as reagent.

Phosphoric anhydride generally represents from 5 to 15% (by weight) of composition no. 1.

According to the present invention, composition no. 2 comprises:
one or more compound(s) that are a source of urea, and
one or more source(s) of water.

Said composition no. 2 preferably comprises solid urea, for example in powder form. The source of water can be water and/or any other liquid residue, such as liquid sludges and liquid manures, or mixtures thereof.

The amount of urea to be supplied depends on the desired amount of nitrogen in the final product that is obtained. Accordingly, approximately from 3 to 10%, preferably from 4 to 5%, nitrogen is generally desired in the final product. For this, the amount of urea supplied generally represents from 0.1% to 1% (by weight) of the waste to be treated.

The amount of water in composition no. 2 generally depends on the moisture in the waste. Advantageously, composition no. 2 supplies the amount of water that allows composition no. 1 to react with the maximum effectiveness, if necessary when the waste is not sufficiently moist.

The combination of composition no. 1 and composition no. 2 according to the invention advantageously improves the solubility and dispersibility of CaO. The Na and K oxides and peroxides in fact permit the formation of sodium hydroxide and potassium hydroxide, which are highly soluble. In addition, they also supply oxygen which, when added to that from composition no. 2, permits the additional liberation of heat so that the temperature of the reaction mixture is generally from 80 to 120° C.

Said treatment is particularly suitable for treatment on an industrial scale, batchwise or continuously. Batchwise treatment is more particularly advantageous.

Said method according to the invention comprises the following steps:
1. mixing of the waste with the combination according to the invention;
2. maturing of the resulting reaction mixture.

Generally, from 5 to 15% by weight of composition no. 1, based on the mass of the waste to be treated, are added.

Generally, from 0.5 to 10% by weight of composition no. 2, based on the mass of the waste to be treated, are added.

The amount of urea supplied by composition no. 2 generally represents from 0.001% to 1% (by weight), preferably from 0.1 to 1%, of the waste to be treated.

Said method according to the invention is preferably carried out with aspiration of air so that the gases or vapours formed are evacuated to a conventional air purification device.

Said method can also advantageously be carried out by means of a supervision module such as an electrical program which automatically manages the implementation of the method. Such modules are known per se and are within the scope of the person skilled in the art.

The waste to be treated is generally domestic waste and the like, sludges, carbon-containing waste, agroalimentary waste, agricultural waste, or any other type of organic waste.

Prior to step 1), the incoming waste can optionally be homogenized, for example continuously, by conventional means known per se. This operation can be carried out especially in a storage and preparation tank, for example by gentle agitation in order to break up any lumps, while avoiding grinding in order to prevent the mineral elements that are generally present from being crushed or broken into small fragments, which would render them more difficult to separate off subsequently.

According to a particular aspect, the method according to the invention can also comprise, prior to step 1), the addition of water. The proportion of water added depends on the nature of and moisture in the waste to be treated, in order to ensure that the reaction can readily be controlled and that the temperature is uniform irrespective of the batch treated. The proportion of water added is generally from 0.1% to 5% by weight, based on the mass of the waste to be treated.

Preferably, step 1) is carried out in a closed mixer equipped with a conventional device for agitating the waste. The waste, optionally destructured, is generally collected in batches and then weighed by conventional means before the reagents are added, in order to ensure total invariance.

According to an advantageous embodiment, step 1) can be carried out by means of the mixer described in patent application FR 2 889 465. Briefly, said mixer comprises:
- an enclosed vessel suitable for receiving said three components and comprising at least one inlet and at least one outlet,
- means for making said vessel move, and
- means for collecting the gaseous emanations resulting from the agitation of the three components inside said vessel.

According to other optional features of said mixer:
- said movement means comprise means for rotating said drum about its axis,
- said drum comprises an inlet disposed in the vicinity of its axis of rotation, said means for collecting gaseous emanations comprise an aspiration pipe which enters said drum through said inlet,
- the device comprises a charging screw which enters said drum through said inlet,
- said drum comprises a plurality of outlets disposed at regular intervals around its axis of rotation,
- said device comprises an outlet spout which is disposed at the foot of said drum and is suitable for communicating with the outlet that is located at the foot of said drum,
- said device comprises, for each of said outlets, controlled doors,
- the system for controlling said doors is of the revolving joint type,
- said drum comprises a plurality of mixing blades distributed at regular intervals over the inside face of its cylindrical wall,
- the axis of rotation of said drum is inclined slightly relative to the horizontal in order to facilitate the discharge of said components,
- the diameter of said drum is greater than its axial length,
- said vessel is mounted on weighing means.

It is generally preferred to pour the compositions separately onto the waste as it is being agitated.

The amount of each ingredient of the combination according to the invention depends on the mass and nature of the waste to be treated.

Under those conditions, by virtue of the presence of the quick lime, the agitation permits very rapid alkalinization of the waste with saponification of the fats and denaturing of the protides and therefore of the microorganisms and fungi that are present. This allows the waste to be sterilized, which is completed by the action of the oxygen that is liberated. This sterilization is also promoted by the increase in temperature, which often exceeds 100° C.

Step 1) is generally carried out for a time which is sufficient to obtain a homogeneous mixture of the waste and the compositions of the combination and/or a stable temperature, which is generally from 80° to 120° C. depending on the nature of the waste. The mixing time is generally from 10 to 50 minutes.

Step 1 can also comprise a step of adjusting the pH of the final product, if required. This may be the case, for example, when composition no. 1 used comprises lime and one or more peroxides and a neutral final product is desired, especially in the case of use as a fertilizer. This adjustment can be made by any means known per se, for example by addition of acid, such as an organic or mineral acid. Advantageously, it can also be effected by means of phosphoric anhydride.

At the end of step 1), the reaction mixture is sent to the inlet of a bioreactor, where it undergoes maturing solely by the action of the reagents, which continue to react with the organic substances in the waste while maintaining a high temperature, generally from 80 to 120° C., until they have been completely denatured, accompanied by extensive dehydration.

During the maturing, the waste slowly moves, without being agitated, towards the other end of the bioreactor and is replaced, as it moves towards the outlet, by waste from a new batch, which ensures that the process is continuous.

The movement of the waste in the bioreactor is effected in a conventional manner known per se, for example by an "endless floor" system. Such a bioreactor is described, for example, in application WO 01/85645. Advantageously, said bioreactor can permit the evacuation of the gases.

The method can be carried out whatever the composition of the waste to be treated, whether or not the waste has previously been sorted within the context of a selective sorting.

At the end of the method, the denatured organic part is totally dried and the waste is then in the form of a dry, sterilized and odourless mixture of powdered granular organic materials mixed with inorganic materials, such as the mineral materials and plastics materials that are resistant to the reagents.

These various materials, which are generally inert and/or dry, can then readily be separated off and recovered by known techniques.

The organic waste, once separated off, is then in the form of sandy granules which are easy to process and constitute an excellent fertilizer, agricultural soil conditioner with or without fertilizer, calcareous or organo-calcareous soil conditioner, or enriched compost.

Advantageously, the method according to the invention allows the final product to be enriched with phosphate, sodium, potassium and nitrogen, which makes it into a more complete fertilizer.

In addition, the use of phosphoric anhydride is particularly advantageous in that the anhydride neutralizes the alkalinity produced by the lime. Accordingly, the pH of the final product can be adjusted to neutral or close to neutrality, advantageously from 7 to 8. Accordingly, the final product is simple to use, with a broad spectrum of activities. It can be used especially as a fertilizer, as an enriched compost or as a manure.

If, however, the final product has a basic pH, for example when phosphoric anhydride is not employed, the use of the final product can be particularly advantageous as a calcareous soil conditioner for improving acid soils.

According to another object, the present invention relates also to the product obtainable by the method according to the invention.

The present invention relates to the use of said product as a fertilizer, as an organic, organo-calcareous or calcareous soil improver with or without fertilizer, and/or as an enriched compost.

According to another object, the present invention relates also to the combinations according to the invention. Generally, said combinations comprise from 70 to 98% by weight of composition no. 1 and from 2 to 30% by weight of composition no. 2. Said compositions nos. 1 and 2 are as defined hereinbefore.

The combination is generally in the form of a kit, the compositions being packaged separately.

The present invention relates also to a process for the preparation of such a combination, comprising:
the preparation of composition no. 1 by addition of its constituents, and
the preparation of composition no. 2 by addition of its constituents.

The examples which follow are given by way of example and do not limit the present invention.

EXAMPLE 1

In a mixer such as that described in application FR 05 08 416 there are added, by weighing, to a 5000-liter vessel, 1750 kg of domestic waste or the like, 175 kg of composition no. 1 containing 155 kg of lime and 20 kg of a mixture of sodium or potassium hydroxide. There are then added 50 kg of composition no. 2, to which powdered urea and liquid have previously been added. The temperature rises to approximately 70/90° C. When the temperature has stabilized, the reaction mixture is sent to a bioreactor such as that of application WO 01/85645, where it is left to mature for approximately 1½ hours. At the outlet of the bioreactor, the pH of the mixture is generally from 11 to 13. Approximately 785 kg of organic products and 785 kg of stabilized and hygienized non-organic products are obtained.

The organic product can be used as such as an organo-calcareous soil-conditioning fertilizer. The other non-organic products can follow a known path of recovery by recycling.

EXAMPLE 2

In a mixer such as that described in application FR 05 08 416 there are added, by weighing, to a 5000-liter vessel, 1750 kg of domestic waste or the like, 140 kg of composition no. 1 containing 125 kg of lime and 15 kg of phosphoric anhydride. There are then added 10 kg of composition no. 2 prepared by adding 50 kg of powdered urea and approximately 4000 liters of liquid to a 5000-liter vessel. The temperature rises to approximately 80/100° C. When the temperature has stabilized, the reaction mixture is sent to a bioreactor such as that of application WO 01/85645, where it is left to mature for approximately 1½ hours. At the outlet of the bioreactor, the mixture has a pH close to 7.

785 kg of organic products and 785 kg of stabilized and hygienized non-organic products are obtained.

The organic final product can be used as such as a soil-conditioning fertilizer with fertilizer or as an enriched compost. The other non-organic products can follow a known path of recovery by recycling.

The invention claimed is:

1. A method of treating waste, comprising the following successive steps:
   1) a mixing process comprising:
      a) introducing the waste into a closed mixer equipped with a device for agitation;
      b) agitating the waste in the mixer;
      c) mixing the waste with a composition no. 1 and a composition no. 2 as the waste is being agitated, to form a reaction mixture,
      the composition no. 1 comprising:
         quick lime (CaO); and
         one or more oxidizing mineral or organomineral compound(s) which are exothermic in water, and
      the composition no. 2 comprising:
         one or more compound(s) which are a source of urea, and
         one or more source(s) of water;
   2) a maturing process comprising:
      d) introducing the reaction mixture through an inlet to a bioreactor; and
      e) slowly moving the reaction mixture, without being agitated, through the bioreactor toward an end of the bioreactor.

2. The method according to claim 1, wherein said one or more oxidizing mineral or organomineral compound(s) is sodium oxide, potassium oxide, sodium peroxide, potassium peroxide, phosphoric anhydride, or mixtures thereof.

3. The method according to claim 1, wherein said composition no. 1 comprises phosphoric anhydride.

4. The method according to claim 1, wherein said composition no. 1 comprises from 70 to 95% by weight of quick lime (CaO).

5. The method according to claim 1, wherein said composition no. 1 comprises from 10 to 30% by weight of sodium oxide, potassium oxide, sodium peroxide, potassium peroxide or mixtures thereof.

6. The method according to claim 1, wherein said composition no. 1 comprises from 5 to 15% by weight of phosphoric anhydride.

7. The method according to claim 1, wherein composition no. 2 comprises:
solid urea; and
water, liquid sludges, liquid manures, or mixtures thereof.

8. The method according to claim 1, wherein composition no. 1 represents from 5 to 15% by weight of the waste to be treated.

9. The method according to claim 1, wherein composition no. 2 represents from 0.5 to 10% by weight of the waste to be treated.

10. The method according to claim 1, further comprising adjusting the pH of the reaction mixture toward neutral pH.

11. The method according to claim 1, wherein said method is carried out along with aspiration of air.

12. The method according to claim 1, wherein the waste is agitated in step b) until the waste is homogenous.

13. The method according to claim 1, wherein the maturing process of step 2) is carried out in a bioreactor with an endless floor.

14. The method according to claim 1, wherein after mixing the waste with composition no. 1 and composition no. 2 to form the reaction mixture, the reaction mixture is maintained at a temperature of 80° C. to 120° C.

\* \* \* \* \*